United States Patent [19]

Miller et al.

[11] 4,343,697

[45] Aug. 10, 1982

[54] COMBINED HYDRAULIC FLUID RESERVOIR AND RETURN FLUID FILTER SUPPORT STRUCTURE

[75] Inventors: Wayne R. Miller; Cyril W. Von Fumetti, both of Dubuque, Iowa

[73] Assignee: Deere & Company, Moline, Ill.

[21] Appl. No.: 917,479

[22] Filed: Jun. 21, 1978

[51] Int. Cl.³ ............................................. B01D 27/10
[52] U.S. Cl. ..................................... 210/90; 210/130; 210/167
[58] Field of Search ............................... 210/130–132, 210/433 A, 434, 90, 168, 167, 85

[56] References Cited

U.S. PATENT DOCUMENTS

| | | | |
|---|---|---|---|
| 2,076,935 | 4/1937 | Burckhalter | 210/130 X |
| 3,487,932 | 1/1970 | Forrester et al. | 210/130 |
| 3,628,661 | 12/1971 | Codo | 210/130 |
| 3,847,243 | 11/1974 | Barth | 180/79.2 R |
| 3,960,174 | 6/1976 | Latimer et al. | 137/563 |
| 3,970,557 | 7/1976 | Shoup | 210/130 |

Primary Examiner—John Adee

[57] ABSTRACT

A pair of return fluid filters are supported within a main cavity of a hydraulic fluid reservoir for receiving fluid from the bottoms of respective return fluid cavities defined by a housing fixed to a top wall of the reservoir. Respective access covers close the cavities and are connected to the return fluid filters and to respective removable bottom plates of the cavities such that the filters may be withdrawn from the main cavity, via the return fluid cavities, for service or replacement. Each cavity is provided with a bypass valve which acts to bypass return fluid directly from the associated return fluid cavity to the main cavity in the event that the associated filter becomes clogged. Mounted on the housing in alignment with the bypass valves are respective switches which are respectively operated in response to movement of the bypass valves to their bypass position to energize a light to indicate the clogged filter condition to an operator.

13 Claims, 5 Drawing Figures

COMBINED HYDRAULIC FLUID RESERVOIR AND RETURN FLUID FILTER SUPPORT STRUCTURE

BACKGROUND OF THE INVENTION

The present invention relates to hydraulic fluid supply systems and more particularly relates to such of those systems which have return fluid filter assemblies located within fluid supply reservoirs.

Fluid supply systems of a type to which the present invention pertains are normally constructed to have unfiltered return fluid enter the bottom of a filter element mounted in the reservoir. In some of these systems, as represented by U.S. Pat. No. 3,847,243 issued to Barth on Nov. 12, 1974, the reservoir includes a return fluid compartment located below the filter assembly and return fluid plumbing is connected to the compartment which is in turn connected in fluid communication with the bottom of a filter element. In others of these systems, as represented by U.S. Pat. No. 3,960,174 granted to Latimer et al on June 1, 1976, the return fluid plumbing is connected directly in communication with the lower end of the filter element.

A common drawback exists in the two ways disclosed in the aforementioned patents for conveying return fluid into the filter element. Specifically, in both cases unfiltered fluid will drain from the filter element as the latter is being withdrawn from the reservoir for replacement. The patented Barth design has the further drawback that in the event of a failure in the return fluid plumbing or in components connected thereto, a considerable amount of fluid might drain from the reservoir due to the failure or might have to be drained from the reservoir before the failed component can be replaced.

It is here noted that the patented Latimer et al design does not suffer the last-mentioned drawback as the return fluid inlet thereof is located in the filter at a level above that to which the reservoir containing the filter assembly is intended to be filled. However, the Latimer et al design is not entirely satisfactory since it requires a considerable amount of space in the top of the reservoir to be kept empty and space is always at a premium on vehicles.

SUMMARY OF THE INVENTION

According to the present invention, there is provided a novel hydraulic fluid reservoir and return fluid filter assembly combination.

An object of the invention is to mount a return fluid filter assembly within a reservoir for being easily removed therefrom without draining unfiltered fluid thereinto.

A further object of the invention is to mount a return fluid filter assembly within a reservoir such that a substantial portion of the reservoir may be filled with fluid and such that very little fluid will be drained from the reservoir, via the return fluid plumbing, in the event of a failure in the return fluid plumbing, or in the event that a failed component must be disconnected from the return fluid plumbing.

Yet another object of the invention is to provide a combined reservoir and filter assembly for supplying fluid to two separate sub-systems of the vehicle hydraulic system with the filter assembly being connected to the return fluid lines of the two sub-systems such that a failure of the return fluid plumbing of one sub-system will have little or no effect on the other subsystem.

These and other objects are accomplished by a structure comprising a reservoir including a top wall defined in part by a housing which in turn defines a pair of separate return fluid cavities, each of which includes an access cover and a vertically shiftable bottom wall portion fixed to each other and to a filter element by a center bolt. Each bottom wall portion is located at approximately the level to which the reservoir is intended to be filled and contains a filter inlet port for connecting the cavity in fluid communication with the top end of the filter element. Separate return fluid inlets are respectively located in the bottoms of the cavities. Each return fluid cavity is provided with a bypass valve operable to route fluid directly from the return fluid cavity to a main cavity of the reservoir when the associated filter element becomes clogged, the bypass valve acting at the same time to energize a circuit containing an indicator light.

DESCRIPTION OF THE PREFERRED EMBODIMENT

Figure 1:
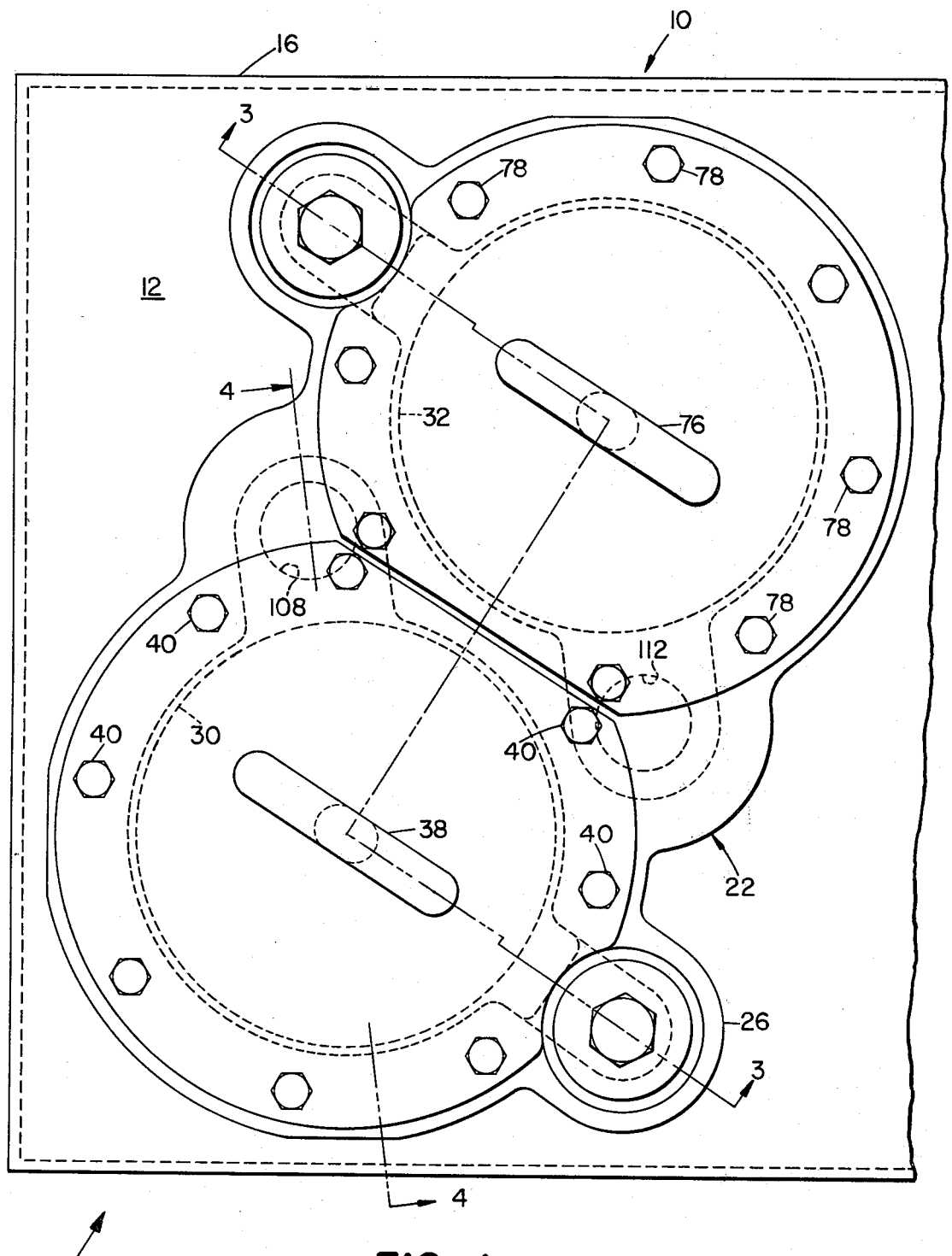
FIG. 1 is a top plan view of a combined reservoir and return fluid filter assembly constructed in accordance with the present invention.

Referring now to FIGS. 1–4, therein is shown a combined reservoir and a return fluid filter assembly 10 including an outer reservoir shell defined by top, bottom and side walls 12, 14 and 16 respectively, which form a main cavity 18 intended for holding fluid up to a predetermined full level, here represented by line 20.

Forming a part of the top wall 12 in a housing 22, which, as viewed from the top, is shaped complementary to an opening 24 in the remainder of the top wall and has a flange 26 which overlies and is welded to the remainder of the top wall in bordering relationship to the opening 24. The housing 22 defines two separate return fluid cavities 30 and 32, respectively. Providing access to the cavity 30 are vertically aligned upper and lower circular openings 34 and 36, respectively. The top opening 34 is closed by an access cover 38 releasably held in place by a plurality of cap screws 40. The bottom opening 36 is blocked by a circular plate 42 having a seal 44 located in its periphery, the plate 42 being supported in place by the cover 38, in a manner to be described, for vertical movement therewith. Specifically, the plate 42 is provided with a centrally located threaded hole 46 disposed in vertical alignment with a threaded blind bore 48 located in the lower end of a projection 50 formed integrally with the underside of the access cover 38. An upper threaded end of a center bolt 52 is threaded into the hole 46 and bore 48 and has a lock nut 54 received thereon between the hole and bore for retaining the plate 42 in proper vertical disposition relative to the bottom opening 36. The center bolt 52 also serves to retain a pair of vertically stacked filter elements 56 in supported relationship from the cover 38 and for this purpose has an end plate 58 fixed thereto adjacent a lower end thereof and sealingly engaged with a lower end 60 of a lower one of the elements 56, the bolt 52 acting through the plate 58 to hold an upper end 62 of an upper one of the elements 56 in sealed engagement with the plate 42. A piece of hexagonal bar stock 64 is fixed to the lower end of the bolt 52 for engagement by a wrench to facilitate tightening of the lock nut 54. The mating ends of the elements 56 are centered by means of a guide member 66 fixed to the center bolt 52 adjacent the mating ends of the filter elements 56. A hole 68 in the plate 42 establishes fluid communication between the cavity 30 and the top end of the stacked filter elements 56 while a hole 70 in the guide member 66 insures free fluid flow from the upper to the lower one of the elements 56. It is herenoted that if it is desired to use only one of the filter elements 56, a shorter center bolt may be used without a guide member fixed thereto.

The cavity 32 is similar to the cavity 30 and providing access to the cavity 32 are vertically aligned upper and lower circular openings 72 and 74 respectively. An access cover 76 is releasably fixed over the opening 72 by means of cap screws 78 and a circular plate 80 is received in blocking relationship to the opening 74 and carries a seal 82 in its periphery. A center bolt 84 has a threaded upper end received in a threaded hole 86 located centrally in the plate 80 and in a threaded blind bore 88 located in the lower end of a vertical projection 90 forming an integral part of the cover 76. A lock nut 92 is located on the center bolt above the plate 80 for holding the latter in proper position relative to the opening 74. A pair of vertically stacked filter elements 94 are held between the plate 80 and an end plate 96 fixed to a lower end of the center bolt 84. A hexagonal piece of bar stock 98 is fixed to the lower end of the bolt to facilitate tightening of the lock nut 92. Fixed to the bolt 84 at a location adjacent the mating ends of the elements 94 is a guide member 100. Holes 102 and 104 are respectively located in the plate 80 and member 100 for respectively establishing fluid communication between the cavity 32 and the upper end of the stacked elements 94 and between the lower end of the upper element and the upper end of the lower element.

Figure 2:
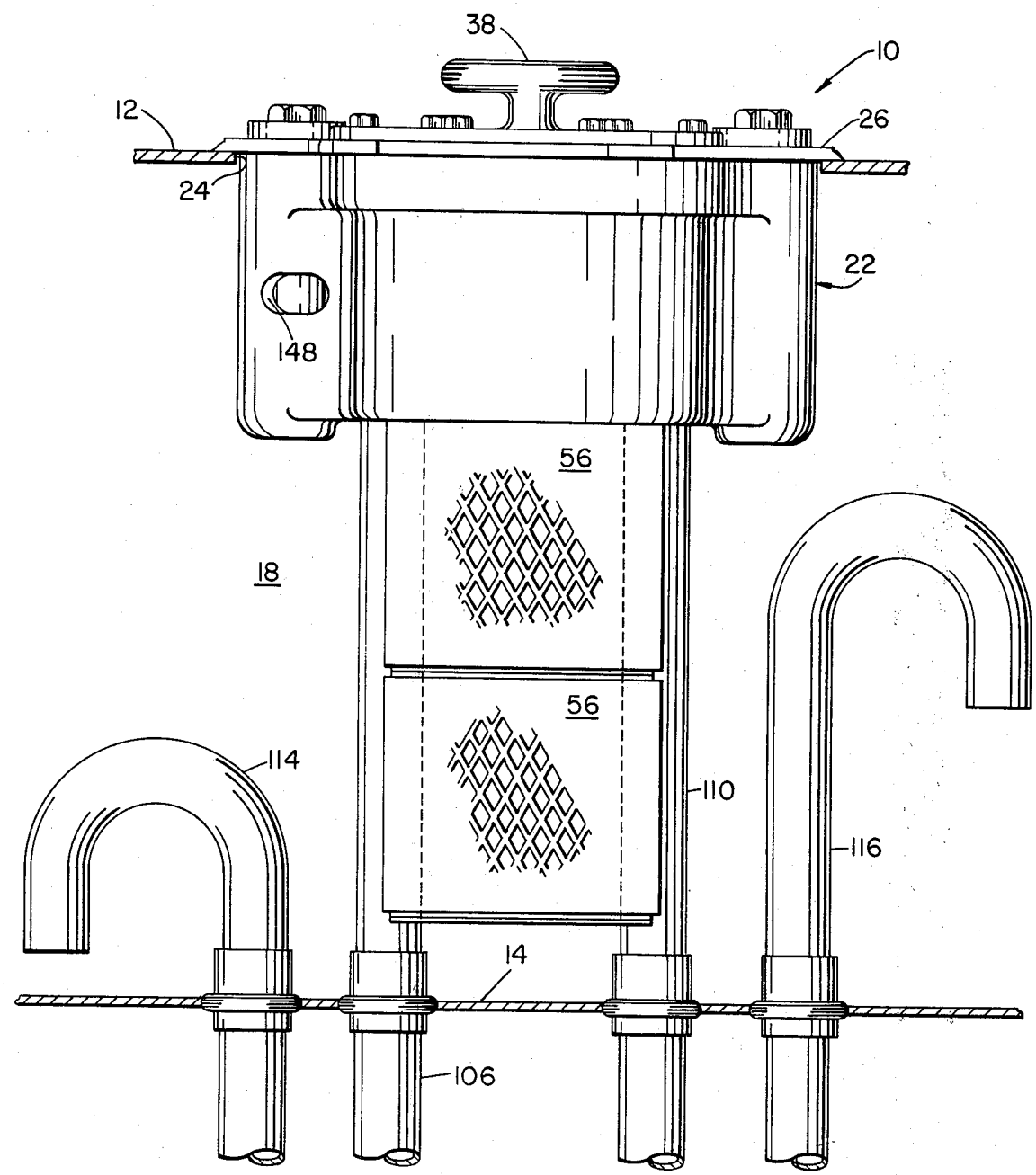
FIG. 2 is a reduced elevational view taken in the direction of arrow A in FIG. 1 with part of the reservoir wall being broken away to expose the housing, defining the return fluid cavities, and the plumbing for conveying fluid to and from the reservoir.
Figure 3:
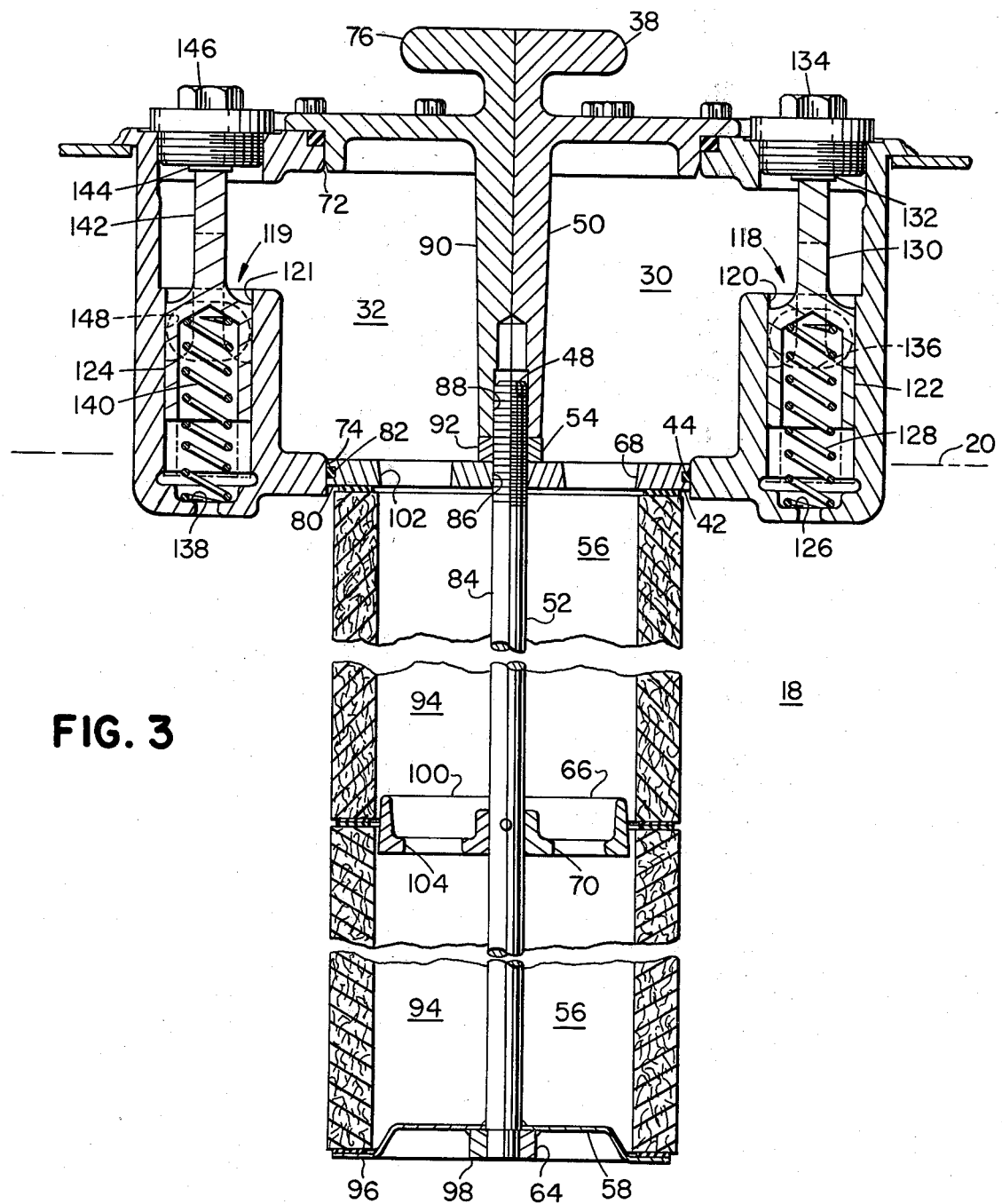
FIG. 3 is a reduced vertical sectional view taken along line 3—3 of FIG. 1 but with the plumbing removed for clarity.
Figure 4:
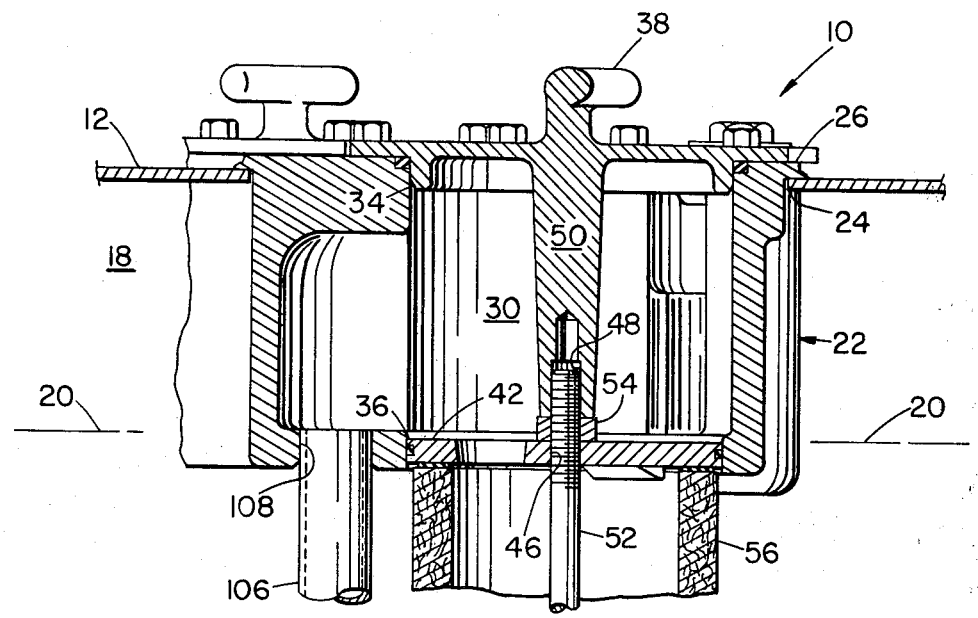
FIG. 4 is a reduced vertical sectional view taken along line 4—4 of FIG. 1.

As can best be seen in FIGS. 1, 2 and 4, a first return fluid conduit 106 enters the bottom wall 14 of the reservoir and is coupled to a return fluid inlet port 108 located in the bottom wall of the return fluid cavity 30 at approximately the full level 20. Similarly, a second return fluid conduit 110 enters the bottom wall 14 of the reservoir and is coupled to a return fluid port 112 located in the bottom wall of the return fluid cavity 32. The conduits 106 and 110 respectively form part of the return fluid plumbing of first and second hydraulic subsystems. Fluid is supplied to the first and second sub-systems by means of first and second fluid supply conduits 114 and 116 respectively extending through the bottom wall 14 of the reservoir. The first and second hydraulic sub-systems could be for steering and loader sub-systems of a loader type vehicle, for example, and it is noted that the level at which the conduit 114 draws in fluid is below that at which the conduit 116 draws in fluid so that when the conduits 114 and 116 are supplying fluid to steering and loader function sub-systems, steering fluid will continue to be available even after a failure in the loader function sub-system.

The housing 22 also defines respective portions of separate bypass valve assemblies 118 and 119 respectively located within the return fluid cavities 30 and 32 and respectively including vertical valve bores 120 and 127 having bottom ends in direct fluid communication with the main cavity 18, at a level below the full level 20, and having respective upper ends in direct fluid communication with the return fluid cavities 30 and 32. Respectively vertically shiftably mounted in the bores 120 and 121 are bypass valve members 122 and 124. Located in the bore 120 between a shoulder 126 at the lower end of the bore and downwardly facing surface of the valve member 122 is a spring 128 which biases the valve member 122 upwardly to engage a stem 130 forming an upper portion thereof into engagement with a switch 132 carried by a threaded plug 134 located in axial alignment with the bore 120. The switch 132 is held in a closed position when engaged by the stem 130 when the valve member 132 is in a normal position as illustrated in solid lines in FIG. 3. Upon the filter elements 56 becoming clogged, the pressure in the cavity 30 will build and eventually cause the valve member 122 to shift downwardly to a bypass position, as illustrated in dashed lines in FIG. 3, such as to unblock a bypass port 136 connecting the bore 120 in fluid communication with the main cavity 18 and such as to permit the switch 132 to open.

Similarly, located in the bore 121 between a shoulder 138 at a lower end of the bore and a downwardly facing surface of the valve member 124 is a spring 140 which biases the valve member 124 upwardly to normally establish engagement of an upward extending stem 142 with a switch 144 carried by a threaded plug 146 located in axial alignment with the bore 120. The switch 144 is held in a closed position when engaged by the stem 142. However, upon the filter elements 94 becoming clogged, the stem 142 will move away from the switch 144 to permit the latter to open and will at the same time uncover a bypass port 148 connecting the bore 121 in fluid communication with the main cavity 18.

Figure 5:
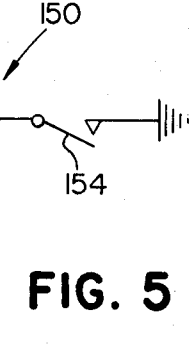
FIG. 5 is a schematic representation of the electrical circuit for indicating the need for filter element replacement.

Referring now to FIG. 5, therein is an electrical indicator circuit 150 including a ground lead 152 having the normally closed switches 132 and 144 and an engine oil pressure controlled switch 154 connected therein in series with each other. An indicator power lead 156 branches from the lead 152, at a junction 158, and contains an indicator light 160. A resistor 162 is located in the ground lead 152 between the junction 158 and switch 132. The circuit 150 is shown in a de-energized condition as would occur when the engine ignition switch (not shown) is turned off. Turning on the ignition switch energizes the lead 156 and the indicator light 160 turns on to verify its operability. Then upon the engine being started, the engine oil pressure controlled switch 154 is closed to bypass current to ground, thus resulting in the turning off of the light 160. However, current flow through the light 160 to turn the latter on is again established in the event that either of the sets of stacked filter elements becomes clogged such that the associated valve member 122 or 124 shifts to respectively effect opening of the switches 132 or 144.

The operation of the invention is briefly as follows. Assuming the stacked filter elements 56 and 94 to be properly filtering return fluid passing therethrough, return fluid will respectively enter the return fluid cavities 30 and 32 via the conduits 106 and 110 and pass from there into the top ends of the stacked elements 56 and 94 via the holes 68 and 102. The fluid is then filtered as it passes through the filter element walls into the main cavity 18 from where it is pumped via the the supply conduit 114 for redistribution to the first hydraulic subsystem including the conduit 106 and via the supply conduit 116 for redistribution to the second hydraulic sub-system including the conduit 110.

If it is desired to replace the filter elements 56, the cap screws 40 are removed and the access cover 38 raised to withdraw the elements 56 from the reservoir. As the elements 56 are raised, filtered fluid will drain therefrom into the main cavity 18 of the reservoir. Once the elements 56 are withdrawn from the reservoir, wrenches may be used to disassemble the center bolt 52 from the plate 42 and cover 38 to permit replacement of the elements 56. Once the replacement filter elements are in place on the bolt 52, the latter is again connected to the plate 42 and cover 38. The access cover 38 is then manipulated to reinsert the new filters through the cavity 30 into place and the capscrews 40 are then installed to again secure the cover 38 in place.

If the stacked filter elements 56 should become clogged before they are replaced, the fluid returning through conduit 106 will accumulate in the cavity 30 and the pressure thereof will eventually exert sufficient force on the top of the bypass valve member 122 to cause it to shift downwardly to open the bypass port 136 to permit return fluid to flow directly from the return cavity 30 to the main cavity 18. Upon the valve member 122 shifting downwardly, the switch 132 is permitted to open to thus establish current flow through the indicator light 160 to effect illumination of the same to warn an operator of the clogged filter condition.

In the event that the return fluid plumbing, which is formed in part by the conduit 106, breaks or a component coupled to this plumbing is removed for replacement or repair, only a small amount of fluid will be drained from the reservoir via the conduit 106 since once the fluid level in the reservoir falls below the level of the inlet port 108, any siphoning effect will be broken.

It will then be appreciated, that any problems experienced by the return fluid plumbing connected to the return fluid cavity 30 will have no effect on that part of the system including the return fluid plumbing coupled to the cavity 32 and vice-versa.

Flow to and from the cavity 32 occurs in a similar manner to how it occurs to and from the cavity 30 and for the sake of brevity no further description of the operation is given.

We claim:

1. A combined hydraulic fluid reservoir and filter support assembly, comprising: a walled reservoir defining at least a first walled, generally tubular filter insertion-withdrawal passage extending thereinto from a top of the reservoir and having a lower terminal end located at approximately a predetermined full level to which the reservoir is adapted to be filled; an access cover releasably mounted in closing relationship to a top end of the passage; a vertically shiftable plate located in closing relationship to said passage adjacent the terminal lower end thereof; said plate forming part of a filter mounting means fixed to the access cover and holding an upper end of a filter element assembly in sealed engagement with the plate; said plate cooperating with the passage and access cover to define a return fluid cavity separate from a remaining portion of the reservoir; a filter inlet port provided in the plate for conveying fluid from the cavity to the filter element assembly and a return fluid conduit connected to the cavity at approximately said full level.

2. The assembly defined in claim 1 wherein said filter mounting means includes a center rod extending axially through the filter element assembly and having an upper end threaded into both the plate and the access cover.

3. The assembly defined in claim 1 wherein the reservoir includes a top wall provided with an opening; a housing having a flange overlying and sealingly fixed to the top wall in bordering relationship to said opening; and said housing including said first walled, generally tubular filter insertion-withdrawal passage.

4. The assembly defined in claim 1, and further including a vertical valve bore formed in a wall portion of said cavity and having an open upper end exposed to the cavity and an open lower end exposed to the remaining portion of the reservoir; a fluid pressure sensing valve member vertically shiftably mounted in the bore between the upper and lower ends thereof; a bypass port connecting the bore to the remaining portion of the cavity; a spring engaged with an under surface portion of the valve member and normally yieldably holding the latter in an upper position blocking the bypass port from fluid communication with the upper open end of the bore, the valve member being shiftable to a lower position establishing fluid communication btween the upper open end of the bore and the bypass port in response to a build up of fluid pressure in the cavity, as occurs when the filter element assembly is filled with contaminates; and an electrical circuit means for indicating the condition of said first filter assembly and including a switch mounted in the top of the reservoir vertically above the valve member and operable thereby to effect a warning condition in the circuit when the valve member shifts to its lower position.

5. The assembly defined in claim 1 wherein said walled reservoir defines a second walled, generally tubular filter insertion-withdrawal passage extending thereinto from the top thereof and having a lower terminal end located approximately at said full level; a second access cover releasably mounted in closing relationship to a top end of the second passage; a second vertically shiftable plate located in closing relationship to said second passage adjacent a terminal lower end thereof; said second plate forming part of a second filter mounting means fixed to the second access cover and holding an upper end of a second filter element assembly in sealed engagement with the second plate; said second plate cooperating with the second passage and second access cover to define a second return fluid cavity separate from the first-mentioned cavity, a second filter inlet port provided in the second plate for conveying fluid from the second cavity to the second filter assembly; and a second return fluid conduit connected to the second cavity at approximately said full level.

6. The assembly defined in claim 5 wherein the reservoir includes a top wall provided with an opening; a housing having a flange overlying and sealingly fixed to the top wall in bordering relationship to said opening; and said housing including said first and second walled, generally tubular filter insertion-withdrawal passages.

7. The assembly defined in claim 5, and further including a second vertical valve bore formed in a wall portion of said second cavity and having an open upper end exposed to the second cavity and an open lower end exposed to the remaining portion of the reservoir; a second fluid pressure sensing valve member vertically shiftably mounted in the second bore before the upper and lower ends thereof; a second bypass port connecting the second bore to the remaining portion of the second cavity; a second spring engaged with an undersurface portion of the second valve member and normally yieldably holding the latter in an upper position blocking the second bypass port from fluid communication with the upper open end of the bore, the second valve member being shiftable to a lower position establishing fluid communication between the upper open end of the second bore and the second bypass port in response to a build up of fluid pressure in the second cavity, as occurs when the second filter element assembly is filled with contaminates; and said electrical circuit means for indicating the condition of said first filter assembly also acting to indicate the condition of said second filter assembly and including a second switch mounted in the top of the reservoir vertically above the second valve member and operable thereby to effect a warning condition in the circuit when the second valve member shifts to its lower position.

8. A combined hydraulic fluid reservoir and filter support assembly, comprising: a walled reservoir including a main cavity for holding filtered fluid up to a predetermined full level and at least a first return fluid cavity separated from the main cavity; said return fluid cavity including a releasably mounted access cover defining a top wall portion of the reservoir and a vertically shiftable plate forming a removable bottom wall portion of the return fluid cavity located vertically below the access cover at approximately said predetermined full level; filter support means fixed to the access cover and supporting a top of a filter element in fluid tight engagement with said plate; a filter inlet port located in the plate and connecting the cavity to an upper interior portion of the filter element; and a return fluid conduit connected to the cavity at approximately said full level.

9. The assembly defined in claim 8 wherein the reservoir includes a second return fluid cavity separated from the first and main cavities; said second return fluid cavity including a second releasably mounted access cover defining a second top wall portion of the reservoir and a second vertically shiftable plate forming a removable bottom wall portion of the cavity located vertically below the second access cover at approximately said full length; a second filter support means fixed to the second access cover and supporting a top of a second filter element in fluid tight engagement with said plate; a second filter inlet port located in the plate and connecting the second cavity to an upper interior portion of the second filter element; and a second return fluid conduit connected to the second cavity at approximately said full level.

10. The assembly defined in claim 9 wherein said main cavity is defined by an outer wall envelope of the reservoir and said first and second return fluid cavities being defined by a housing fixed to said outer wall envelope.

11. The assembly defined in claim 9 wherein said first and second return fluid cavities respectively including first and second pressure-responsive bypass valve means located therein for respectively coupling the first and second return fluid cavities to the main fluid cavity such as to bypass the first and second filter elements when the latter are filled with contaminants such as to respectively cause the pressure in the first and second return fluid cavities to increase; said first and second bypass valve means respectively including first and second pressure-shiftable elements mounted for vertical movement; and electrical warning circuit including first and second filter condition warning switch means respectively mounted in respective top wall portions of the reservoir located vertically above the first and second valve elements for contact thereby when the latter are in normal, non-shifted positions, to establish a non-energized warning circuit but being respectively operative when the first and second valve elements are pressure-shifted therefrom to energize the warning circuit, whereby should either one or both of the first and second filter elements become clogged with contaminants, one or the other or both of the first and second bypass valve means will operate to bypass return fluid around the clogged filter and effect energization of the warning circuit.

12. A combined hydraulic fluid reservoir and return fluid filter support structure assembly comprising: a top reservoir wall provided with an access opening; housing wall means fixed to and located within the reservoir in surrounding relationship to the access opening and defining a second opening located vertically below the access opening approximately at a predetermined level to which the reservoir holds fluid when full; a vertically shiftable plate disposed in sealed closing relationship to the second opening; an access cover removably mounted in closing relationship to the access opening and cooperating with the housing wall means and plate for defining a cavity; a filter support structure fixed to the access cover for movement therewith and including means for supporting a filter bottom and urging a filter top into tight engagement with the plate, said plate being provided with a port establishing a path for return fluid to flow to the filter; and a return fluid inlet port communicating with the cavity at approximately said predetermined level; and a return fluid conduit extending into the reservoir and connected to the return fluid inlet port, whereby the filter support structure is adapted to be withdrawn, together with a supported filter, through the access opening by removing the access cover without unfiltered return fluid entering the reservoir and whereby any tendency for fluid to be siphoned from the reservoir via the return fluid conduit will be inhibited due to a siphon break occurring once the fluid level in the reservoir recedes below the level of the return fluid inlet port.

13. The assembly defined in claim 12 wherein said housing wall means defines a vertical valve bore located within the cavity; upper and lower axially spaced ports connecting the valve bore in communication with the reservoir respectively at locations located above and below said predetermined level; a filter bypass valve member axially shiftably mounted in the valve bore; a spring acting between said wall means and a bottom surface of the valve member to normally urge the latter to a first position wherein it blocks the upper port; a bypass condition indicator element mounted on said housing wall means directly above the valve member for engagement thereby to effect a non-bypass condition indication when the valve member is in its first position; and said valve member being pressure shiftable downwardly to a second position wherein it is free of the upper port and indicator element, the latter then effecting a bypass condition indication.

* * * * *

UNITED STATES PATENT AND TRADEMARK OFFICE
CERTIFICATE OF CORRECTION

PATENT NO. : 4,343,697

DATED : 10 August 1982

INVENTOR(S) : Wayne R. Miller and Cyril W. Von Fumetti

It is certified that error appears in the above-identified patent and that said Letters Patent is hereby corrected as shown below:

Column 6, line 32, delete "btween" and insert -- between --.

Column 7, line 7, delete "before" and insert -- between --; line 51, delete "length" and insert -- level --.

Signed and Sealed this

Fourteenth Day of December 1982

[SEAL]

Attest:

GERALD J. MOSSINGHOFF

Attesting Officer

Commissioner of Patents and Trademarks